United States Patent
Hendriksen et al.

(10) Patent No.: US 8,304,128 B2
(45) Date of Patent: Nov. 6, 2012

(54) SOLID OXIDE CELL AND SOLID OXIDE CELL STACK

(75) Inventors: Peter Vang Hendriksen, Hillerød (DK); Rasmus Barfod, Roskilde (DK); Yi-Lin Liu, Jyllinge (DK); Ming Chen, Roskilde (DK)

(73) Assignee: Topsoe Fuel Cell A/S, Lyngby (DK)

( * ) Notice: Subject to any disclaimer, the term of this patent is extended or adjusted under 35 U.S.C. 154(b) by 245 days.

(21) Appl. No.: 12/627,082

(22) Filed: Nov. 30, 2009

(65) Prior Publication Data
US 2010/0136380 A1 Jun. 3, 2010

(30) Foreign Application Priority Data
Dec. 3, 2008 (DK) .............................. 2008 01704

(51) Int. Cl.
*H01M 8/10* (2006.01)
(52) U.S. Cl. ......... 429/479; 429/484; 429/486; 429/488
(58) Field of Classification Search .................. 429/479, 429/484, 488, 486
See application file for complete search history.

(56) References Cited

U.S. PATENT DOCUMENTS

| | | | |
|---|---|---|---|
| 5,543,239 A | * | 8/1996 | Virkar et al. ............... 429/482 |
| 6,682,842 B1 | | 1/2004 | Visco et al. |
| 7,141,329 B2 | | 11/2006 | Hong et al. |
| 2004/0166380 A1 | | 8/2004 | Gorte |
| 2008/0124602 A1 | | 5/2008 | Larsen et al. |
| 2008/0193803 A1 | | 8/2008 | Sholklapper |

FOREIGN PATENT DOCUMENTS

| EP | 1 928 049 A1 | 6/2008 |
|---|---|---|
| JP | 5-190183 A | 7/1993 |

* cited by examiner

*Primary Examiner* — Jane Rhee
(74) *Attorney, Agent, or Firm* — Dickstein Shapiro LLP (57) ABSTRACT

A solid oxide cell obtainable by a process comprising the steps of: depositing a fuel electrode layer on a fuel electrode support layer; depositing an electrolyte layer comprising stabilized zirconia on the fuel electrode layer to provide an assembly of fuel electrode support, fuel electrode and electrolyte; optionally sintering the assembly of fuel electrode support, fuel electrode and electrolyte together to provide a pre-sintered half cell; depositing on the electrolyte layer of the pre-sintered half cell one or more oxygen electrode layers, at least one of the oxygen electrode layers comprising a composite of lanthanum-strontium-manganite and stabilized zirconia to provide a complete solid oxide cell; sintering the oxygen electrode layers together with the pre-sintered half cell to provide a sintered complete solid oxide cell; and impregnating the one or more oxygen electrode layers of the sintered complete solid oxide cell with manganese to obtain a manganese impregnated solid oxide cell.

12 Claims, 4 Drawing Sheets

SOLID OXIDE CELL AND SOLID OXIDE CELL STACK

BACKGROUND OF THE INVENTION

1. Field of the Invention

The invention relates to solid oxide cells (SOCs) in which the formation of degradation products is reduced. More specifically the invention concerns solid oxide fuel cells and solid oxide electrolysis cells in which degradation of oxygen electrodes comprising lanthanum-strontium-manganite (LSM) is inhibited.

2. Description of the Related Art

Solid oxide cells, also known as reversible solid oxide cells, can be used as solid oxide fuel cells and as solid oxide electrolysis cells. The solid oxide cell basically consists of three different layers—a middle layer of an oxide ion conducting electrolyte that is gastight that is sandwiched between electrode layers. The electrode layers are porous, electron and ion conducting and each solid oxide cell has an oxygen electrode and a fuel electrode. A solid oxide fuel cell is described in the following:

A solid oxide fuel cell (SOFC) is a high temperature fuel cell which generates electricity directly from an electrochemical reaction, and it is composed entirely of solid-state oxide materials, typically ceramics. This composition allows SOFCs to operate at much higher temperatures than other fuel cell types such as PEM fuel cells. Typical operating temperatures are 600° C. to 1000° C.

In the solid oxide fuel cell the oxygen electrode is the cathode where a reduction of oxygen to oxygen ions takes place. The fuel electrode is the anode where oxidation of hydrogen to hydrogen ions and then water takes place. An electrochemical energy conversion takes place in the solid oxide fuel cell, whereby electricity is generated from external supplies of fuel (on the anode side) and oxidant (on the cathode side). These react therefore at the electrodes in the presence of an electrolyte.

Usually the reactant flowing to the anode is a fuel such as hydrogen or methane. When methane is used as a fuel, internal reforming takes place at the anode surface whereby methane is reformed in the presence of steam to hydrogen and carbon monoxide. The hydrogen is then converted in the electrochemical reaction. The oxidant flowing to the cathode is usually air or oxygen.

Solid oxide fuel cells can be operated in reverse mode as solid oxide electrolysis cells (SOEC) to perform electrolysis of $H_2O$ and/or $CO_2$ for hydrogen or synthesis gas (a mixture of hydrogen, $H_2$ and carbon monoxide, CO) production.

In the solid oxide electrolysis cell the oxygen electrode is the anode where an oxidation of oxygen ions to oxygen takes place. The fuel electrode is the cathode where reduction of water to hydrogen takes place.

Conventional composite oxygen electrodes are manufactured using an electron conductive material such as lanthanum-strontium-manganite (LSM) and an oxygen ion conductive material such as yttria-stabilised zirconia (YSZ). These oxygen electrodes are deposited on a dense electrolyte surface made of an oxygen ion conductive solid oxide such as YSZ.

The reduction-oxidation reactions take place mainly at the triple phase boundaries where the electrode, the electrolyte and oxygen or hydrogen are in contact with each other. The triple phase boundary is therefore influenced by the reactions occurring at the interface between the electrode and the electrolyte. Efficient gas diffusion and increased contact areas between the electrolyte and the electrodes are therefore important.

Performance of the oxygen electrode is mainly determined by the resistance present at the oxygen electrode-electrolyte interface. It is desirable to reduce the interfacial resistance and increase the occurrence of triple phase boundaries. Thereby electrode polarisation resistance is decreased and the overall performance of the oxygen electrode is improved. The cell operation temperature and the partial pressure of oxygen in the oxygen electrode chamber also influence the performance of the oxygen electrode. Inadequate control of the above factors can lead to the formation of degradation products at the triple phase boundaries and thus a reduction in the SOFC or SOEC performance.

A known degradation product resulting in increased interfacial resistance between the oxygen electrode and the electrolyte is lanthanum zirconate, $La_2Zr_2O_7$ (abbreviated LZO). This undesirable degradation product is formed at the interface between the lanthanum-strontium-manganite (LSM) oxygen electrode and the yttria stabilised zirconia (YSZ) electrolyte and its formation is increased by heating of the for instance SOFC at high temperatures such as during sintering of the SOFC. The formation of LZO is also increased under high polarisation during cell testing.

Other known degradation products are strontium zirconate (SZO) and oxide compounds of La—Zr—Si, and Sr—Zr—Si.

Degradation of LSM-YSZ has been identified to be the dominant contribution to cell degradation under severe test conditions i.e. at low temperatures and high current densities. Barfod et al., Solid State Electrochemistry Proc. 26th Risø, International Symposium on Materials Science, Risø National Laboratory, Roskilde, page 121 (2005), also point out that the degradation rate is strongly dependent on the oxygen partial pressure on the cathode side in solid oxide fuel cells, the degradation rate being significantly higher in air than in pure oxygen.

Both LZO and La-silicate have been reported by D. Kuscer et al., Solid State Ionics 78 (1995) 79, to form at a $LaMnO_3$/YSZ interface during aging at 1450° C.

Studies (A. Hagen et al., Electrochemical Society Transactions, Vol. 2007-07, No. 1, page 301-309) indicate that LZO is present as nano-sized particles distributed locally and preferably in LSM/electrolyte contact areas in long term tested solid oxide fuel cells. The formation of nano-sized strontium zirconate (SZO) particles at the interface between the cathode and electrolyte may also be a possibility. Both LZO and SZO phases have insulating properties due to their low conductivity when compared to zirconia electrolyte, and their presence weakens the electrical contact of the cathode and electrolyte.

Various attempts have been made to inhibit the formation of lanthanum zirconate. U.S. Pat. No. 7,141,329 B2 discloses an electrode having a microstructure of extended triple phase boundary with a porous ion conductive ceria film coating. This coating is made from one or more doped oxide sols selected from $CeO_2$ polymeric sols or particulate sol and can be manufactured at a lower temperature by employing a sol-gel method resulting in preventing generation of undesired interfacial reaction products.

F. Umemura et al. (Denki Kagaku Oyobi Kogyo Butsuri Kagaku (Electrochemistry and Industrial Physical Chemistry) (Japan) v63:2. (5 Feb. 1995) page 128-133) evaluated the microscopical characterization of a degraded air electrode to examine the sintering and reaction of an electrode material. Half cells were produced and measured by $La_{0.9}Sr_{0.1}MnO_3$ and 8YSZ obtained when 8% $Y_2O_3$-stabilized zirconia was added. Adding the YSZ controlled the generation of $La_2Zr_2O_7$ in the interface between the electrode and electrolyte.

The electrochemical characteristics of $La_{1-x}Sr_xMnO_3$ for solid oxide fuel cells and the formation of lanthanum zirconate has also been studied by H. M. Lee in Materials Chemistry and Physics, 2003, V77, N3 (January 30), page 639-646. The optimum amount of Sr in $La_{1-x}Sr_xMnO_3$ for a solid oxide fuel cell cathode material was studied by observing the charge transfer resistance, electrical conductivity, and reactivity with the electrolyte. The reactivity between the electrolyte and $La_{1-x}Sr_xBO_3$ (B=Cr, Mn, Co) was investigated and it was found that the secondary phase, $La_2Zr_2O_7$, was not formed when the substitution amount of Sr was 50 moles.

Other known attempts to control the formation of LZO and SZO include utilising in the SOFC a LSM cathode containing a surplus of Mn. During preparation the LSM cathode is super stoichiometric in manganese, whereby manganese oxide is present as a secondary phase in the cathode.

JP patent application no. 5190183 discloses a solid oxide fuel cell with a fuel electrode containing yttria stabilised zirconia. Subsequently a slurry of powdered yttria stabilised zirconia powder and MnOx powder is made and this slurry is applied to the surface of the solid electrolyte, followed by calcination. Manganese thus exists in the three-phase zone consisting of fuel electrode, a solid electrolyte and the gaseous phase. The activation polarisation of the fuel electrode became smaller and output of the SOFC cell improved.

The chemical reactivity and interdiffusion of LSM and YSZ have been studied by J. A. M. Roosmalen, Solid State Ionics 52 (1992) page 303-312. They observe the formation of reaction products LZO and SZO and propose that resulting reaction layers including LZO and SZO might result in both ohmic and polarisation losses of the SOFC. They suggest that the ohmic losses are due to the low conductivity of the reaction products and the polarisation losses are due to the blocking of oxygen transfer at the three-phase boundary between cathode, electrolyte and oxygen. It is suggested to reduce the La and/or the Sr activity by decreasing the (La, Sr):Mn ratio in LSM.

However, these steps of introducing manganese in a super stoichiometric amount, though shown effective in reducing zirconate formation, are not enough to avoid the formation of LZO and SZO in the interface in the triple phase boundaries between the oxygen electrode comprising LSM and the YSZ electrolyte in solid oxide cells, when these are operated for prolonged periods and at strong polarisation.

SUMMARY OF THE INVENTION

It is therefore an objective of the invention to provide a solid oxide cell less prone to degradation.

It is a further objective of the invention to provide a solid oxide cell showing improved long term performance.

These objectives and others are accomplished by providing a solid oxide cell obtainable by a process comprising the steps of:

depositing a fuel electrode layer on a fuel electrode support layer depositing an electrolyte layer comprising stabilised zirconia on the fuel electrode layer to provide an assembly of fuel electrode support, fuel electrode and electrolyte optionally sintering the assembly of fuel electrode support, fuel electrode and electrolyte together to provide a pre-sintered half cell depositing on the electrolyte layer of the pre-sintered half cell one or more oxygen electrode layers, at least one of the one or more oxygen electrode layers comprising a composite of lanthanum-strontium-manganite and stabilised zirconia to provide a complete solid oxide cell sintering the one or more oxygen electrode layers together with the pre-sintered half cell to provide a sintered complete solid oxide cell impregnating the one or more oxygen electrode layers of the sintered complete solid oxide cell with manganese to obtain a manganese impregnated solid oxide cell.

Sintering the assembly of fuel electrode support, fuel electrode and electrolyte together to provide a pre-sintered half cell is optional. If sintering is not carried out then the assembly of fuel electrode support, fuel electrode and electrolyte provides a half cell.

In this case the subsequent steps are as follows:

depositing on the electrolyte layer of the half cell one or more oxygen electrode layers, at least one of the one or more oxygen electrode layers comprising a composite of lanthanum-strontium-manganite and stabilised zirconia to provide a complete solid oxide cell sintering the one or more oxygen electrode layers together with the half cell to provide a sintered complete solid oxide cell impregnating the one or more oxygen electrode layers of the sintered complete solid oxide cell with manganese to obtain a manganese impregnated solid oxide cell.

Accordingly, the invention encompasses a solid oxide cell comprising a fuel electrode layer deposited on a fuel electrode support layer and an electrolyte layer comprising stabilised zirconia deposited on the fuel electrode layer, and deposited on the electrolyte layer one or more oxygen electrode layers, at least one of the one or more oxygen electrode layers comprising a composite of lanthanum-strontium-manganite and stabilised zirconia, and the fuel electrode, the fuel electrode support layer, the electrolyte layer and the one or more oxygen electrode layers being simultaneously sintered, and the sintered one or more oxygen electrode layers thereafter being further impregnated with manganese.

Accordingly, the invention encompasses a process for the preparation of the solid oxide cell comprising the steps of:

depositing a fuel electrode layer on a fuel electrode support layer depositing an electrolyte layer comprising stabilised zirconia on the fuel electrode layer to provide an assembly of fuel electrode support, fuel electrode and electrolyte optionally sintering the assembly of fuel electrode support, fuel electrode and electrolyte together to provide a pre-sintered half cell depositing on the electrolyte layer of the pre-sintered half cell one or more oxygen electrode layers, at least one of the one or more oxygen electrode layers comprising a composite of lanthanum-strontium-manganite and stabilised zirconia to provide a complete solid oxide cell sintering the one or more oxygen electrode layers together with the pre-sintered half cell to provide a sintered complete solid oxide cell impregnating the one or more oxygen electrode layers of the sintered complete solid oxide cell with manganese to obtain a manganese impregnated solid oxide cell.

Furthermore, the invention provides a solid oxide cell stack comprising one or more the solid oxide fuel cells or one or more solid oxide electrolysis cells.

In an embodiment of the invention at least one of the one or more oxygen electrode layers comprises a composite of lanthanum-strontium-manganite and stabilised zirconia and the atomic ratio of manganese to lanthanum and strontium in the lanthanum-strontium-manganite is greater than 1.

This embodiment can be in combination with anyone of the embodiments disclosed above and below.

In an embodiment of the invention zirconia is stabilised with yttria, scandia, magnesia or calcium oxide.

In a preferred embodiment of the invention zirconia is stabilised with yttria.

In an embodiment of the invention impregnation with manganese of the one or more oxygen electrode layers is repeatedly carried out until at least one of the one or more oxygen electrode layers is impregnated with a predetermined amount of manganese.

In an embodiment of the invention impregnation of the one or more oxygen electrode layers with manganese is repeatedly carried out until the oxygen electrode layer comprising a composite of lanthanum-strontium-manganite and stabilised zirconia is impregnated with a predetermined amount of manganese. This embodiment can be in combination with anyone of the embodiments disclosed above and below.

In an embodiment of the invention manganese is impregnated on the surface of at least one of the one or more oxygen electrode layers in concentrations of 0.5 to 5 mg/cm$^2$.

In an embodiment of the invention manganese is impregnated using an aqueous solution of manganese (II) salt.

In an embodiment of the invention the salt is a nitrate, sulphate or chloride.

In an embodiment of the invention the one or more oxygen electrode layers are deposited on the electrolyte layer by screen printing, spraying, tape casting or spray pyrolysis.

In an embodiment of the invention a solid oxide cell stack comprises one or more solid oxide cells. The solid oxide cell stack can comprise at least two solid oxide cells.

In an embodiment of the invention the solid oxide cell is a solid oxide fuel cell or a solid oxide electrolysis cell.

The solid oxide cell of the invention is characterized by having an interface between the oxygen electrode and the electrolyte that is rich in manganese. Manganese is present in excess and it can be present either locally at the triple phase boundaries between the electrolyte, the oxygen electrode and the oxygen gas or present as a layer situated between the oxygen electrode and the electrolyte.

The presence of manganese in excess either as a layer or locally at the triple phase boundaries efficiently protects the oxygen electrode/electrolyte interface from degrading during operation of the fuel cell stack by reducing the reactivity between LSM in the oxygen electrode and stabilized zirconia in the electrolyte. The risk of zirconate formation is decreased.

The invention relates to the reduction of degradation in solid oxide cells. It is concerned with the inhibition of degradation in electrodes of the lanthanum-strontium-manganite (LSM) type including composite electrodes of the LSM/NSZ (stabilised zirconia, where N represents different stabilising components) type in solid oxide fuel cells and solid oxide electrolysis cells.

Degradation has been identified as the loss of LSM coverage and the loss of triple phase boundary length. It is observed by a size reduction of the individual LSM/electrolyte contact areas and a decrease in triple phase boundary length due to the formation of at least one of the insulating phases LZO, SZO and Sr—Zr—Si oxide compounds. The insulating phases are present as nano-particles distributed locally and preferably in the LSM/electrolyte contact areas.

The solid oxide cell of the invention is suitable for use as either a solid oxide fuel cell or solid oxide electrolysis cell. It has a reduced concentration of one or more of the insulating phases LZO (the most important), SZO and La—Zr—Si or Sr—Zr—Si oxide compounds, when compared to a solid oxide cell having a conventional oxygen electrode. The reduced concentration is observed both before and after exposure to severe operation conditions such as strong polarisation and prolonged operation periods.

Additionally, the adhesion between the oxygen electrode and the electrolyte of the solid oxide cell of the invention is improved because the LSM grains are prevented from detaching themselves from the stabilized zirconia electrolyte surface.

The solid oxide cell has been modified in a specific manner in order to facilitate this reduction in the formation of the insulating phases. The modification comprises sintering of the solid oxide cell after deposition of the oxygen electrode layer followed by impregnation of the oxygen electrode layer with a manganese solution.

Preparation of the solid oxide cell of the invention is described in detail as follows:

A fuel electrode support layer is prepared preferably by tape casting. A fuel electrode layer is deposited on the fuel electrode support layer by for instance spraying or other methods well known in the art. The fuel electrode layer and the fuel electrode support layer can be any conventional materials useful in the preparation of solid oxide cells.

For solid oxide cells the fuel electrode support layer can for instance be a Ni-NSZ composite, where N can represent Mg, Ca, Y, Sc or other elements known in the art for instance Ce and Gd.

The fuel electrode layer can alternatively be a porous metal based on Fe—Cr alloy particles. Furthermore, the fuel electrode layer can be a ceramic such as doped $SrTiO_3$.

Preferable for solid oxide fuel cells are Ni-NSZ composites and a porous metal based on Fe—Cr alloy particles and preferable for solid oxide electrolysis cells are ceramics such as doped $SrTiO_3$.

For solid oxide cells the fuel electrode layer can for instance be (1) a Ni-NSZ composite where N represents Mg, Ca, Y, Sc, and (2) a ceramic such as doped $SrTiO_3$.

Preferable for solid oxide fuel cells are 1) and 2) and for solid oxide electrolysis cells is 2).

An electrolyte layer is deposited on the fuel electrode layer. The electrolyte layer is stabilised zirconia, generally abbreviated to NSZ, where N denotes the stabilising element. N represents yttrium, scandium, magnesium or calcium. Preferable is yttria stabilised zirconia (YSZ) and most preferable is $Y_{0.15}Zr_{0.85}O_{1.925}$ (abbreviated TZ8Y) for both solid oxide fuel cells and solid oxide electrolysis cells.

Deposition can preferably be carried out by spraying, screen printing, spray pyrolysis, tape casting or other methods known in the art.

The assembly of the fuel electrode support layer, the fuel electrode layer and the electrolyte is generally termed a half cell. The half cell obtained based on these components can optionally be sintered also termed pre-sintering. Typically the half cell is sintered to provide a pre-sintered half cell. Sintering can be carried out at temperatures above 1200° C. An advantage of including this sintering step is the formation of a strong half cell for subsequent processing where oxygen electrode application method and sintering temperature can be chosen within a wider range.

One or more oxygen electrode layers are then deposited on the electrolyte layer of the half cell or of the pre-sintered half cell, and at least one of the oxygen electrode layers comprises a composite of lanthanum-strontium-manganite and NSZ (LSM-NSZ), where N is selected from the group consisting of Mg, Ca, Y, Sc and mixtures of these elements. LSM is stoichiometric or super-stoichiometric with respect to manganese. Manganese may thus be present in excess in the oxygen electrode composition. Preferably, manganese is present in excess in amounts up to 10 wt %.

By stoichiometric is meant that the atomic ratio Mn/(La+Sr) equals 1, i.e. that the material is synthesised such that the concentration of the elements matches the one for a perfect perovskite. There are equal amounts of (atomic %) of the elements that go on the A-site in the structure (La, Sr) and elements that go to the B-site (Mn).

By superstoichiometric is meant that the compound is synthesised such that there is an excess of Mn relative to the 1:1 ratio of the stoichiometric compound, i.e. the ratio manganese to lanthanum and strontium (Mn/(La+Sr)) is larger than one (atomic %). This imbalance leads to the formation of vacant A-sites in the material and/or formation of small amounts of secondary Mn oxide phases such as MnO, $MnO_2$ or others.

An example of a LSM-NSZ layer suitable as an oxygen electrode layer is 50 wt % LSM-50 wt % YSZ.

A complete solid oxide cell is obtained when the one or more oxygen electrode layers are deposited on the electrolyte layer of the half cell or the pre-sintered half cell.

The oxygen electrode layer can also be a composite multilayer consisting of two or more layers of different composition, where at least one layer is a composite of LSM-NSZ, where N for instance is yttrium. An example of a dual oxygen electrode layer can consist of a first oxygen electrode layer of LSM-NSZ and a second oxygen electrode layer of LSM. In a preferable embodiment of the invention N is yttrium.

The oxygen electrode layers can be deposited on the electrolyte layer of the half cell or of the pre-sintered half cell by different methods such as screen printing, tape casting, spraying, spray pyrolysis or other similar methods known in the art.

The oxygen electrode layer that is a composite of LSM-NSZ can have a thickness of 5 to 40 microns, and the oxygen electrode layers that are not a composite of LSM-NSZ can have a thickness of 10 to 100 microns. The electrolyte layer can have a thickness of 1 to 20 microns. The fuel electrode layer can have a thickness of 1 to 20 microns and the fuel electrode support layer can have a thickness of 200 to 1000 microns.

After deposition of a predetermined amount of the one or more oxygen electrode layers on the electrolyte layer, the half cell or pre-sintered half cell deposited with the one or more oxygen electrode layers is sintered to provide a sintered complete solid oxide cell. This step is important in order to ensure the adherence of the oxygen electrode to the electrolyte. Sintering takes place at temperatures of 900° C. to 1300° C., preferably 950° C. to 1100° C.

After sintering, the one or more oxygen electrode layers of the sintered complete solid oxide cell are impregnated with manganese. The impregnation can be done by using a manganese solution, which can be an aqueous solution of a manganese salt, for instance a manganese (II) salt. The salts can for instance be nitrates, sulphates, chlorides or other conventional salts suitable for forming an aqueous solution of a manganese salt. Preferable are nitrates. A manganese impregnated solid oxide cell is obtained.

Impregnation of Mn (II) onto the oxygen electrode can also be carried out by a combustion synthesis process. For example as follows: a precursor combining glycine with Mn-nitrate in an aqueous solution can be dripped onto the oxygen electrode while the cell is heated. The precursor is also heated to evaporate excess water thereby yielding a viscous liquid. Further heating to about 180° C. caused the precursor liquid to auto ignite, and Mn (II) is impregnated into the oxygen electrode.

It is a preferable embodiment of the invention that manganese nitrate is deposited on the surface of the oxygen electrode layer in concentrations of 0.5 to 5 $mg/cm^2$, corresponding to 0.5-5 mg Mn per $cm^2$ at the oxygen electrode/electrolyte interface. At these concentrations manganese is present in excess either locally at the triple phase boundaries between the electrolyte, the oxygen electrode and the oxygen gas or is present as a layer situated between the oxygen electrode and the electrolyte. More preferably it is deposited at a concentration of 0.5-3 $mg/cm^2$.

The impregnation can be repeatedly carried out in order to obtain a predetermined concentration of manganese on the surface of the oxygen electrode layer. It can be vacuum assisted if required.

After impregnation with manganese the solid oxide cell obtained is dried by heating at a temperature of up to 300° C. After drying the resulting solid oxide cell is suitable for use in a solid oxide fuel cell stack or a solid oxide electrolysis stack.

Application of a solid oxide fuel cell obtained by the inventive process in a solid oxide fuel cell stack leads to a reduction in the content of at least one of the degradation products LZO, SZO, La—Zr—Si and Sr—Zr—Si in the triple phase boundaries between the oxygen electrode, electrolyte and the gas after exposure to severe operating conditions.

DETAILED DESCRIPTION OF THE PREFERRED EMBODIMENTS

Examples

Example 1

Preparation of a Solid Oxide Cell Containing Manganese in Excess Concentration

A solid oxide cell whose oxygen electrode/electrolyte interface contains Mn in excess concentration is manufactured by the following steps:
(1) tape-casting a fuel electrode support layer (AS)
(2) Spraying an fuel electrode layer (A) on the surface of the fuel electrode support layer
(3) Spraying a 10 micron electrolyte layer (E) of 8% $Y_2O_3$—stabilised zirconia (TZ8Y) on the surface of the fuel electrode layer to obtain a half cell
(4) sintering the half cell at a temperature above 1200° C.
(5) Screen printing a LSM-YSZ oxygen electrode layer of 20-30 microns in thickness on the surface of the electrolyte layer (6) simultaneously sintering the half cell and the LSM-YSZ oxygen electrode layer deposited on the half cell
(7) impregnating the oxygen electrode layer with Mn-Nitrate aqueous solution prepared by dissolving 10 g Mn-nitrate in 100 ml distilled water. Repeating the impregnation step until a concentration of 0.5-5 mg Mn/cm$^2$ is obtained in the impregnated cell.
(8) drying the impregnated cell by heating at a temperature of 80° C. to obtain a solid oxide cell.

The following details refer to the preparation steps of example 1:

The suspension for tape-casting is manufactured by means of ball milling of powders with polyvinyl pyrrolidone (PVP), polyvinyl butyral (PVB) and ethanol (EtOH) and methyl ethyl ketone (MEK) as additives. The suspension is tape-cast using a double doctor blade set-up and the tape is subsequently dried.

(1) AS layer: The suspension comprised 45 vol % yttria stabilised zirconia (YSZ) and 55 vol % NiO powder. The green thickness of the tape-cast layer was in the range of 400 μm. The porosity of this layer was in the range of 30% after sintering and reduction.
(2) A layer: The slurry of A layer comprised 40 vol % YSZ and about 60 vol % NiO powder. After spraying and sintering the thicknes of the A-layer was approximately 10 μm. The porosity of this layer was approximately 25% after sintering and reduction.
(3) E layer: The slurry of E layer comprised TZ8Y. After spraying and sintering the thickness of the E layer was approximately 10 μm.
(4) The half-cell consisting of the fuel electrode support layer, the fuel electrode layer and the electrolyte layer was sintered in a furnace at a temperature above 1200° C. with a ramp up of 100° C./h and left for about 12 hours to cool to room temperature to form a sintered half cell.
(5) An oxygen electrode layer was deposited on the sintered half-cell by screen printing an ink comprising a 1:1 weight ratio mixture of $La_{0.75}Sr_{0.25}Mn_{1.05}O_{3-\delta}$ and YSZ on the surface of the electrolyte layer (E). The thickness of the oxygen electrode layer was 20-30 μm before sintering.
(6) sintering of the half cell deposited with an oxygen electrode layer in a furnace at approximately 1100° C. for 2 hours and then cooling to room temperature.
(7) impregnating the oxygen electrode layer with manganese: A Mn-Nitrate aqueous solution was made by dissolving 10 g Mn-Nitrate (purity 99.999%) in 100 ml distilled water. The solution was dripped on the surface of the porous oxygen electrode layer by an eye dropper. The impregnation process was repeated at least twice to supply a concentration of 0.5-5 mg Mn/cm$^2$ on the oxygen electrode surface to obtain a solid oxide cell.
(8) Drying the impregnated solid oxide cell by heating on a hot plate at approximately 80° C. for 5 min.

Example 2

Preparation of a Solid Oxide Cell Containing Manganese in Excess Concentration

A cell was manufactured as outlined above for Example 1, with the exception that in step 7 the impregnation was vacuum assisted.

The impregnation process was repeated at least twice to supply a concentration of 0.5-5 mg Mn/cm$^2$ on the oxygen electrode surface to obtain a solid oxide cell.

Example 3

Preparation of a Solid Oxide Cell Containing Manganese in Excess Concentration

A solid oxide cell was manufactured as outlined in Example 1 with the exception that in step 7 vacuum assisted impregnating the porous oxygen electrode layer with a Mn-Nitrate solution containing a surfactant Triton-X 100 that was made by dissolving 1 g Triton-X 100 in 100 ml Mn-Nitrate solution.

The impregnation process was repeated at least twice to supply a concentration of 0.5-5 mg Mn/cm$^2$ on the oxygen electrode surface to the final solid oxide cell Example 4

Preparation of a Solid Oxide Cell Containing Manganese in Excess Concentration

A solid oxide cell was manufactured as outlined above for Example 1 with the exception that in step 3 the E-layer was screen printed. The thickness of the electrolyte layer was approximately 10 μm.

In step 5 an oxygen electrode layer was deposited on the sintered half-cell by spraying a slurry comprising a 1:1 weight ratio mixture of $La_{0.75}Sr_{0.25}Mn_{1.05}O_{3-\delta}$ and YSZ on the surface of the electrolyte layer (E). The thickness of the oxygen electrode layer was 20-30 μm before sintering.

The impregnation process was repeated at least twice to supply a concentration of 0.5-5 mg Mn/cm$^2$ on the oxygen electrode surface to the final solid oxide cell.

Example 5

Preparation of a Solid Oxide Cell Containing Manganese in Excess Concentration

A solid oxide cell was manufactured as Example 4 with the exception that in step 7 the impregnation was vacuum assisted.

The impregnation process was repeated at least twice to supply a concentration of 0.5-5 mg Mn/cm$^2$ on the oxygen electrode surface to the solid oxide cell.

Example 6

A solid oxide cell was manufactured as Example 4, with the exception that in step 7 vacuum assisted impregnation of the porous oxygen electrode layer with Mn-Nitrate solution containing a surfactant Triton-X 100 made by dissolving 1 g Triton-X 100 in 100 ml Mn-Nitrate solution.

The impregnation process was repeated at least twice to supply a concentration of 0.5-5 mg Mn/cm$^2$ on the oxygen electrode surface to obtain a solid oxide cell.

Examples 7-12

Preparation of a Solid Oxide Cell Containing Manganese in Excess Concentration Using Manganese Sulphate for Impregnation These examples were carried out in the same manner as in Examples 1 to 6. However, Mn-sulfate was used instead of Mn-nitrate to prepare the aqueous solution for impregnation.

Example 13-18

Preparation of a Solid Oxide Cell Containing Manganese in Excess Concentration Using Manganese Chloride These experiments were carried out as in Examples 1 to 6, but Mn-chloride was used instead of Mn-nitrate to prepare the aqueous solution for impregnation.

Example 19

Preparation of a Solid Oxide Cell Containing Manganese in Excess Concentration A solid oxide cell was manufactured as Example 1, with the exception that in step 1 the suspension comprised Fe—Cr alloy powder, organic binder and pore former. The green thickness of the fuel electrode support tape-cast layer was about 400 μm. The porosity of this layer was in a range of 20-30%; after sintering.

The impregnation process was repeated at least twice to supply a concentration of 0.5-5 mg Mn/cm$^2$ on the oxygen electrode surface to obtain a solid oxide cell.

Example 20

Preparation of a Solid Oxide Cell Containing Manganese in Excess Concentration by Combustion Synthesis A solid oxide cell was manufactured as Example 1 with the exception that in step 7 a combustion synthesis process was used to impregnate Mn (II) onto the oxygen electrode. A precursor combining glycine with Mn-Nitrate in an aqueous solution was dripped onto the oxygen electrode, while the cell was heated. The precursor was heated to evaporate excess water yielding a viscous liquid. Further heating to about 180° C. caused the precursor liquid to auto ignite, and Mn (II) was impregnated into the oxygen electrode.

The positive effect of adding Mn(II) to the electrolyte/oxygen electrode interface by impregnation with an aqueous solution containing Mn(II) is documented in the following 5 figures.

Figure 1:
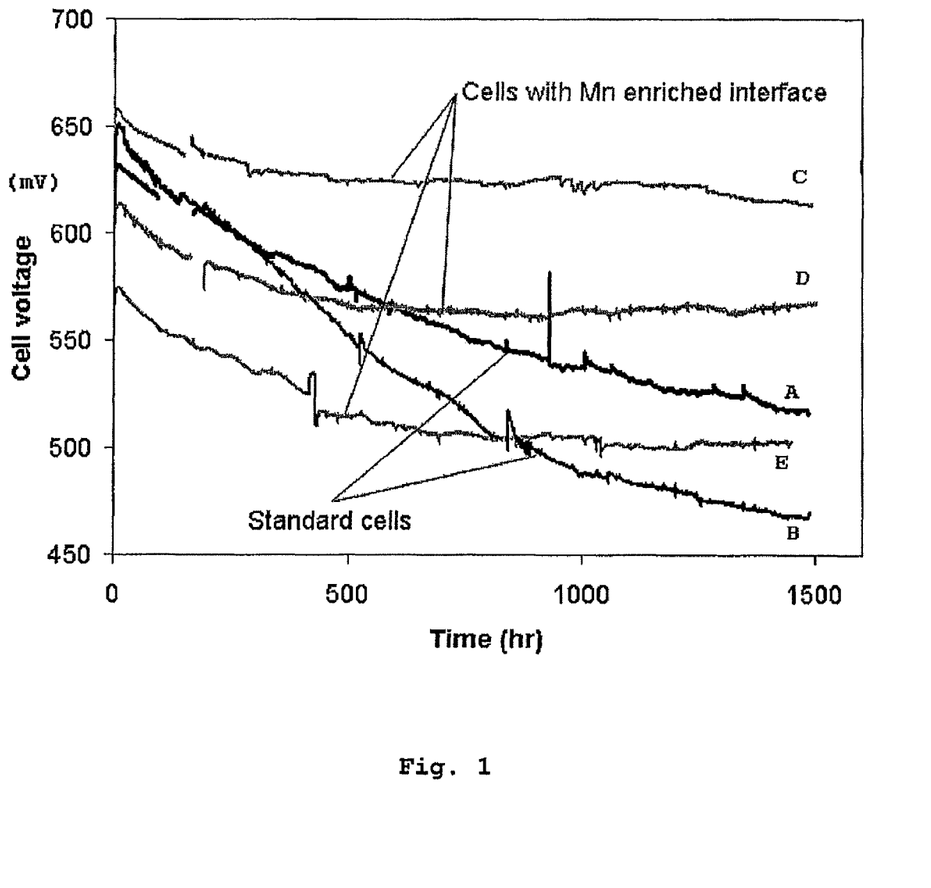
FIG. 1 illustrates aging tests of standard SOC cells and SOC cells of the invention.

FIG. 1 illustrates aging tests of two standard (conventional) solid oxide cells A and B and three solid oxide cells of the invention C, D and E. The cell voltage was recorded at constant current as a function of operation time. The cells were aged at 750° C. under strong polarisation (current density, i=0.75 A/cm$^2$) under 1500 hours of test.

The three solid oxide cells of the invention C, D and E had been impregnated with manganese after deposition of the oxygen electrode layer and sintering and had a concentration in the range of 0.5-5 mg Mn/cm$^2$. It can be seen that the C, D and E stabilize with respect to cell voltage much earlier than A and B, which continue to loose cell voltage throughout the operation time. The performance of the solid oxide cells of the invention therefore show better long term durability than the standard cells tested which show strong degradation.

The beneficial effect of impregnating the oxygen electrode layer with Mn is presumably to suppress the formation of La-zirconate and Sr-zirconate and other degradation products mentioned earlier. That the strong degradation observed for the standard cells is likely to be related to zirconate formation is supported by the findings reproduced in FIG. 2.

Figure 2:
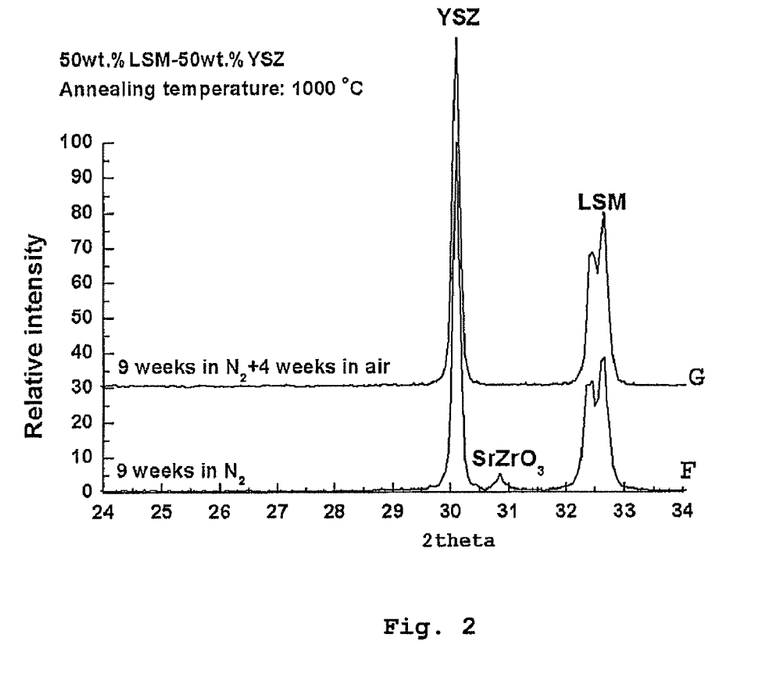
FIG. 2 illustrates X-ray diffractograms of YSZ/LSM powder mixtures after heat treatment in air or nitrogen.

FIG. 2 illustrates X-ray diffractograms of YSZ/LSM powder mixtures after various heat treatments in air or nitrogen. Sample F shows results obtained after exposure of the YSZ-LSM powder mixture to 1000° C. in nitrogen for 9 weeks, while the Sample G shows the results obtained after exposure of the YSZ-LSM powder mixture to 1000° C. in nitrogen for 9 weeks followed by exposure to 1000° C. in air for four weeks.

Here, results of powder reactivity tests are shown and it can be seen that both samples F and G show peaks for YSZ (at 2θ≈30.1) and LSM (at 2θ≈32.4, 32.6). However, sample F shows an additional peak for SrZrO$_3$ at 2θ≈30.9. The same peak was also observed for sample G. However, it disappeared after four weeks exposure to air.

The zirconate formation is thus shown to be strongly dependent on the partial pressure of oxygen, pO$_2$. Zirconate degradation products form if powder mixtures are heat treated in N$_2$. It disappears again if powders are subsequently heat treated in air. This finding supports the working hypothesis that the reason that the cell degradation rate increases with increasing polarization is related to formation of zirconate, as increasing the polarization corresponds to a reduction in the pO$_2$ at the oxygen electrode-particle-electrolyte interface. At low current density (i=0.25 A/cm2) where the relevant partial pressure of oxygen, pO2, in the oxygen electrode/electrolyte interface is much closer to that characteristic of air no degradation is observed.

The addition of super stoichiometric amounts of manganese is known to provide a reduction in the degradation. However this reduction is not effective in the long term when operation of the solid oxide cells is carried out for prolonged periods or at high polarisation.

Figure 3:
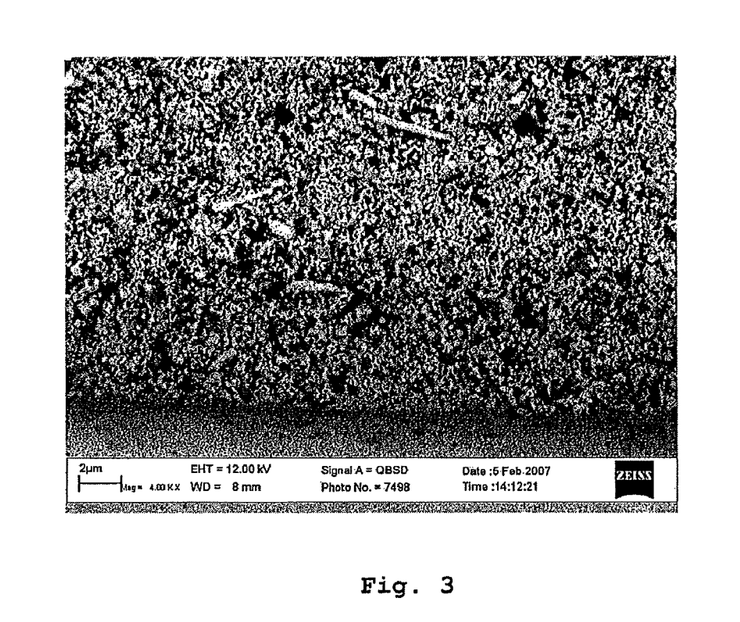
FIG. 3 shows a SEM-image of the electrolyte/oxygen electrode interface of an SOC cell of the invention after 1500 hr of testing.

FIG. 3 shows an SEM-image of the electrolyte/oxygen electrode interface of a SOFC cell of the invention after 1500 hr of testing at 750° C., i=0.75 A/cm$^2$. The interface microstructure differs greatly from the standard SOFC cell (see FIG. 4). A layer with increased Mn content is observed by EDS in the cell of the invention but not in the standard cell. The oxygen electrode in the cell of the invention adheres better to the electrolyte than in the standard cell.

Figure 4:
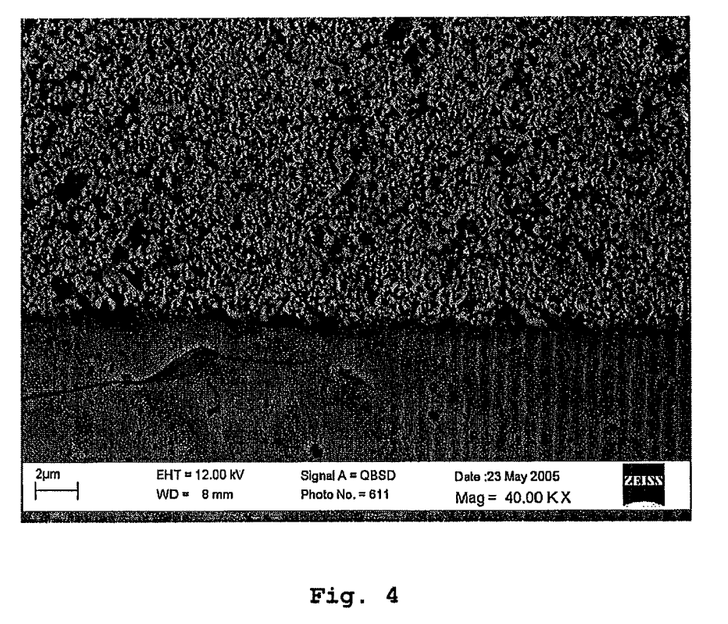
FIG. 4 shows a SEM-image of the electrolyte/oxygen electrode interface of a standard SOC cell after 1500 hr of testing.

FIG. 4 shows an SEM-image of the electrolyte/oxygen electrode interface of a standard SOFC cell after 1500 hr of testing at 750° C., i=0.75 A/cm$^2$.

Figure 5:
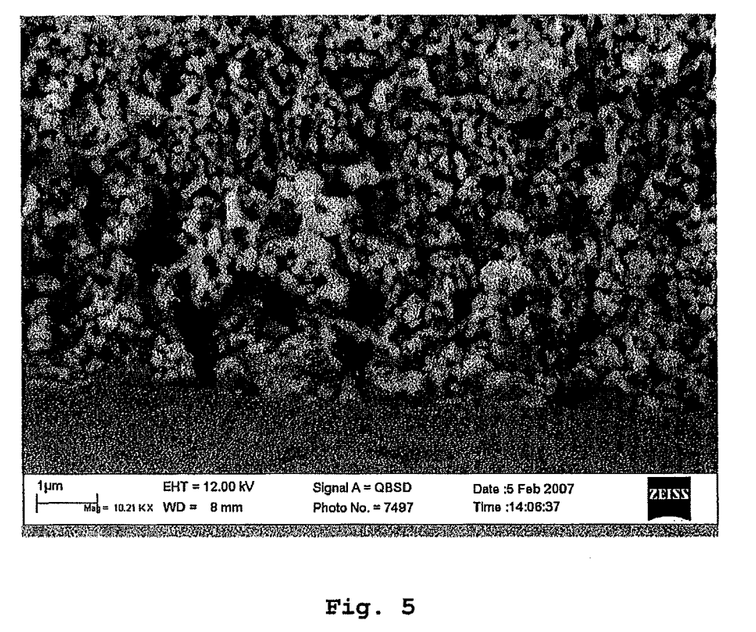
FIG. 5 shows a SEM-image of the electrolyte/oxygen electrode interface of the same SOC cell as in FIG. 3 at a larger magnification.

FIG. 5 shows an SEM-image of the electrolyte/oxygen electrode interface of the same cell as in FIG. 3 but with a larger magnification. Secondary phases are seen in the interface region.

Figure 6:
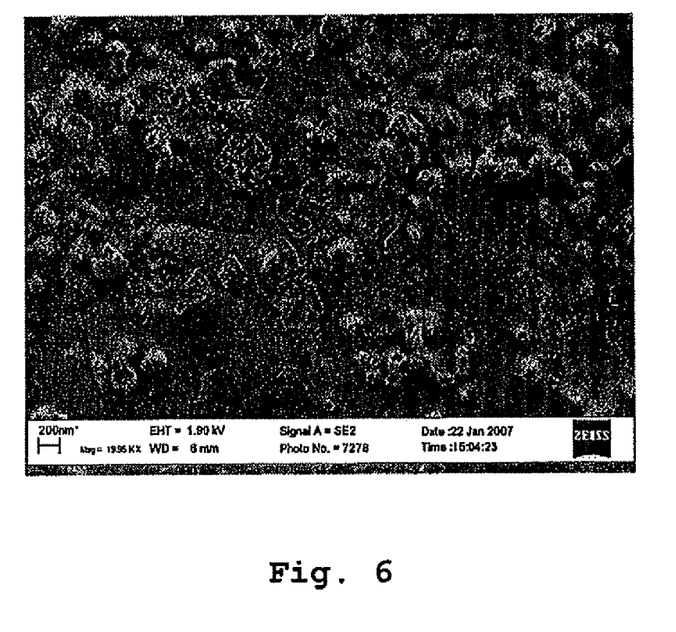
FIG. 6 shows a SEM-image of the electrolyte surface after removal of the oxygen electrode from a SOC cell of the invention after 1500 hr of testing.

FIG. 6 shows an SEM-image of the electrolyte surface after removal of the oxygen electrode of SOFC cell of the invention after 1500 hr of testing at 750° C., i=0.75 A/cm$^2$. Unlike the standard cell shown in FIG. 7, most LSM craters are free of nano-particles. In addition to LSM craters, there are also a large number of imprints of irregular shape. They are likely due to a new phase that was introduced to the interface by Mn-impregnation and helped to anchor the oxygen electrode to the electrolyte.

Figure 7:
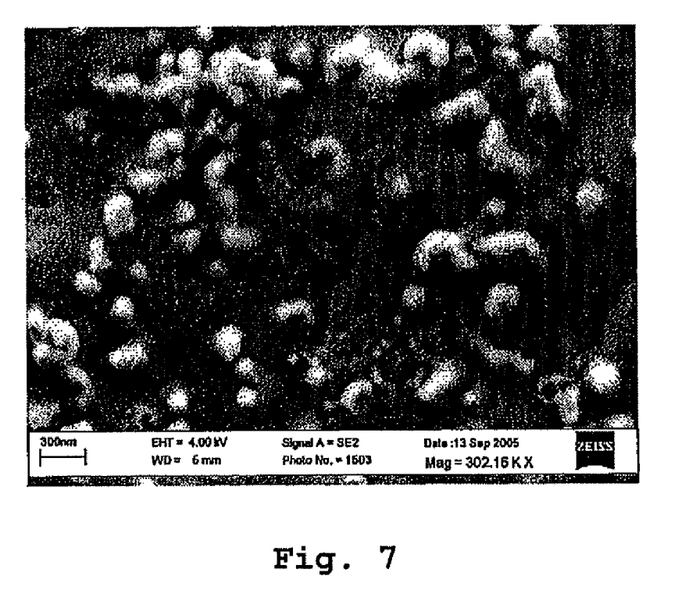
FIG. 7 shows a SEM-image of the electrolyte surface after removal of the oxygen electrode from a standard SOC cell after 1500 hr of testing.

FIG. 7 shows an SEM-image of the electrolyte surface after removal of the oxygen electrode of the cell after 1500 hr of testing at 750° C., i=0.75 A/cm$^2$. Small LSM craters are observed with zirconate nano-particles at the crater rim.

What is claimed is:
1. A solid oxide cell obtainable by a process comprising the steps of:
   depositing a fuel electrode layer on a fuel electrode support layer;
   depositing an electrolyte layer comprising stabilized zirconia on the fuel electrode layer to provide an assembly of fuel electrode support, fuel electrode and electrolyte;

optionally sintering the assembly of fuel electrode support, fuel electrode and electrolyte together to provide a pre-sintered half cell;

depositing on the electrolyte layer of the pre-sintered half cell one or more oxygen electrode layers, at least one of the one or more oxygen electrode layers comprising a composite of lanthanum-strontium-manganite and stabilized zirconia to provide a complete solid oxide cell;

sintering the one or more oxygen electrode layers together with the pre-sintered half cell to provide a sintered complete solid oxide cell; and impregnating the one or more oxygen electrode layers of the sintered complete solid oxide cell with manganese to obtain a manganese impregnated solid oxide cell, wherein at least one of the one or more oxygen electrode layers comprises a composite of lanthanum-strontium-manganite and stabilized zirconia and the atomic ratio of manganese to lanthanum and strontium in the lanthanum-strontium-manganite is greater than 1.

2. A solid oxide cell according to claim 1, wherein zirconia is stabilized with yttria, scandia, magnesia or calcium oxide.

3. A solid oxide cell according to claim 2, wherein zirconia is stabilized with yttria.

4. A solid oxide cell according to claim 1, wherein impregnation with manganese of the one or more oxygen electrode layers is repeatedly carried out until at least one of the one or more oxygen electrode layers is impregnated with a predetermined amount of manganese.

5. A solid oxide cell according to claim 4, wherein impregnation of the one or more oxygen electrode layers with manganese is repeatedly carried out until the oxygen electrode layer comprising a composite of lanthanum-strontium-manganite and stabilized zirconia is impregnated with a predetermined amount of manganese.

6. A solid oxide cell according to claim 4, wherein manganese is impregnated on the surface of at least one of the one or more oxygen electrode layers in concentrations of 0.5 to 5 mg/cm$^2$.

7. A solid oxide cell according to claim 1, wherein manganese is impregnated using an aqueous solution of manganese (II) salt.

8. A solid oxide cell according to claim 7, wherein the salt is a nitrate, sulphate or chloride.

9. A solid oxide cell according to claim 1, wherein the one or more oxygen electrode layers are deposited on the electrolyte layer by screen printing, spraying, tape casting or spray pyrolysis.

10. A solid oxide cell according to claim 1, wherein the solid oxide cell is a solid oxide fuel cell or a solid oxide electrolysis cell.

11. Solid oxide cell stack comprising one or more solid oxide cells of claim 1.

12. Solid oxide cell stack of claim 11, wherein the solid oxide cell is a solid oxide fuel cell or a solid oxide electrolysis cell.

* * * * *